US012774099B1

(12) United States Patent
Carson et al.

(10) Patent No.: US 12,774,099 B1
(45) Date of Patent: Oct. 27, 2026

(54) TIME DELAYED SIGNAL SPLITTER AND BOOSTER

(71) Applicant: Rockwell Collins, Inc., Cedar Rapids, IA (US)

(72) Inventors: Kassidy L. Carson, Colorado Springs, CO (US); Matthew H. Hartman, Peyton, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 19/330,429

(22) Filed: Sep. 16, 2025

(51) Int. Cl.
*B64D 25/10* (2006.01)

(52) U.S. Cl.
CPC .................................... *B64D 25/10* (2013.01)

(58) Field of Classification Search
CPC ................................ B64D 25/10; B64G 1/645
See application file for complete search history.

(56) References Cited

U.S. PATENT DOCUMENTS 4,911,382 A * 3/1990 Aronne ................. B64D 25/10 307/118
5,435,248 A 7/1995 Rode et al.
6,845,947 B1 * 1/2005 Reese, Jr. ............. B64C 1/1476 244/122 AG
7,327,550 B2 2/2008 Meyer et al.
10,501,183 B2 12/2019 Foster et al.
11,390,389 B2 7/2022 Dunst
11,505,325 B2 11/2022 Mccumber et al.
11,548,649 B2 * 1/2023 Hampton ............... B64D 25/10
11,713,127 B2 8/2023 Holstine et al.
12,077,304 B2 9/2024 Benjamin et al.

FOREIGN PATENT DOCUMENTS

CN 117087864 A 11/2023

* cited by examiner

*Primary Examiner* — Brian M O'Hara
(74) *Attorney, Agent, or Firm* — CANTOR COLBURN LLP

(57) ABSTRACT

An ejection system is provided and includes a lead mating connector receptive of a single firing signal, a splitter disposed in series with the lead mating connector and configured to generate first and second event firing signals from the single firing signal and first and second splitter lines connected to the splitter to be receptive of the first and second event firing signals, respectively. Each of the first and second splitter lines includes a firing device unit operable by a corresponding one of the first and second event firing signals. At least one of the first and second splitter lines includes at least one of a time delay unit and a power booster in series with and upstream from the firing device unit.

20 Claims, 6 Drawing Sheets

TIME DELAYED SIGNAL SPLITTER AND BOOSTER

BACKGROUND

The present disclosure generally relates to ejection seats, and more particularly, to an ejection system with a time delayed signal splitter and booster.

Aircraft ejection systems utilize an ejection event sequencer to control ejection seat events. The ejection seat utilizes a high energy catapult assembly (sometimes referred to as a rocket-catapult assembly) to expel the ejection seat from an aircraft. The high energy catapult assembly is an energetic device that includes a catapult stage and a rocket stage. The catapult stage fires first, ejecting the ejection seat and any occupant of the ejection seat from the aircraft cockpit. The rocket stage (sometimes referred to as the propulsion phase) then ignites and propels the ejection seat and its occupant to a separation distance from the aircraft and terrain associated with safe parachute recovery.

As the ejection seat and occupant emerge from the aircraft into the airstream, they are subjected to high aerodynamic loading (sometimes referred to as windblast). Discrete stabilization, restraint, and deceleration subsystems are often deployed from the ejection seat to retain the occupant and ejection system in a safe orientation relative to the airstream while slowing down to a safe velocity for main recovery parachute deployment. These discrete subsystems (e.g. inertial haul-back restraint, articulated stabilization rocket, drogue parachute, arm and/or leg restraints, etc) are typically deployed just prior to, during, or immediately following the catapult phase and are active throughout the rocket phase and even after rocket burnout during free-flight. Various subsystem events discussed above may require event signal outputs from the ejection controller (sequencer) whereas the number of outputs from the controller may be limited.

SUMMARY

According to an aspect of the disclosure, an ejection system is provided and includes a lead mating connector receptive of a single firing signal, a splitter disposed in series with the lead mating connector and configured to generate first and second event firing signals from the single firing signal and first and second splitter lines connected to the splitter to be receptive of the first and second event firing signals, respectively. Each of the first and second splitter lines includes a firing device unit operable by a corresponding one of the first and second event firing signals. At least one of the first and second splitter lines includes at least one of a time delay unit and a power booster in series with and upstream from the firing device unit.

In accordance with at least one or more additional and/or alternative embodiments, the first and second splitter lines are in parallel.

In accordance with at least one or more additional and/or alternative embodiments, the splitter is configured to generate at least the first and second event firing signals from the single firing signal and at least first and second splitter lines are connected to the splitter to be receptive of the at least the first and second event firing signals, respectively.

In accordance with at least one or more additional and/or alternative embodiments, the splitter is configured to generate the first and second event firing signals and at least a third event firing signal from the single firing signal, the first and second splitter lines and at least a third splitter line are connected to the splitter to be receptive of the first and second event firing signals and the at least the third event firing signal, respectively, each of the first and second splitter lines and the at least the third splitter line includes a firing device unit operable by a corresponding one of the first and second event firing signals and the at least the third event firing signal and at least one of the first and second splitter lines and the at least the third splitter line includes at least one of a time delay unit and a power booster.

In accordance with at least one or more additional and/or alternative embodiments, the first and second splitter lines and the at least the third splitter line are in parallel.

In accordance with at least one or more additional and/or alternative embodiments, the firing device unit includes an electro-explosive/mechanical device and a connector.

In accordance with at least one or more additional and/or alternative embodiments, the time delay unit is an in-line time delay unit.

In accordance with at least one or more additional and/or alternative embodiments, the time delay unit of the at least one of the first and second splitter lines delays operation of the corresponding firing device unit partially in accordance with a length of the at least one of the first and second splitter lines.

In accordance with at least one or more additional and/or alternative embodiments, the time delay unit of the at least one of the first and second splitter lines delays operation of the corresponding firing device unit partially in accordance with a predicted boot time of the corresponding power booster.

In accordance with at least one or more additional and/or alternative embodiments, the power booster includes a power source.

In accordance with at least one or more additional and/or alternative embodiments, the power booster is configured to increase a power of the corresponding one of the first and second event firing signals.

According to an aspect of the disclosure, an ejection system is provided and includes a lead mating connector receptive of a single firing signal, a splitter disposed in series with the lead mating connector and configured to generate multiple event firing signals from the single firing signal and multiple splitter lines connected to the splitter to be receptive of the multiple event firing signals, respectively. Each of the multiple splitter lines includes a firing device unit operable by a corresponding one of the multiple event firing signals. At least one of the multiple splitter lines includes at least one of a time delay unit and a power booster in series with and upstream from the firing device unit.

In accordance with at least one or more additional and/or alternative embodiments, the multiple splitter lines are in parallel.

In accordance with at least one or more additional and/or alternative embodiments, the firing device unit includes an electro-explosive/mechanical device and a connector.

In accordance with at least one or more additional and/or alternative embodiments, the time delay unit is an in-line time delay unit.

In accordance with at least one or more additional and/or alternative embodiments, the time delay unit of the at least one of the multiple splitter lines delays operation of the corresponding firing device unit partially in accordance with a length of the at least one of the multiple splitter lines.

In accordance with at least one or more additional and/or alternative embodiments, the time delay unit of the at least one of the multiple splitter lines delays operation of the corresponding firing device unit partially in accordance with a predicted boot time of the corresponding power booster.

In accordance with at least one or more additional and/or alternative embodiments, the power booster includes a power source.

In accordance with at least one or more additional and/or alternative embodiments, the power booster is configured to increase a power of the corresponding one of the first and second event firing signals.

According to an aspect of the disclosure, a method of controlling an ejection system is provided. The method includes receiving, from a sequencer unit, a single firing signal, splitting, at a splitter, the single firing signal into multiple event firing signals for multiple splitter lines and operating a firing device unit of each of the multiple splitter lines in accordance with the corresponding one of the multiple event firing signals. The method further includes, for at least one of the multiple splitter lines and prior to the operating of the firing device unit, at least one of delaying the corresponding one of the multiple event firing signals and boosting a power of the corresponding one of the multiple event firing signals.

In accordance with at least one or more additional and/or alternative embodiments, the method further includes analyzing multiple factors impacting a performance of the ejection system and executing each of the splitting of the single firing signal into the multiple event firing signals, the delaying of the corresponding one of the multiple event firing signals and the boosting of the power of the corresponding one of the multiple event firing signals in accordance with results of the analyzing.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to “a,” “an” or “the” may include one or more than one and that reference to an item in the singular may also include the item in the plural. Further, all ranges may include upper and lower values and all ranges and ratio limits disclosed herein may be combined.

Conventional ejection seats typically include an electronic event sequencer that accepts a finite power supply and single event start signal as inputs and provides a series of sequential events (electrical firing signals) as outputs. The resulting power output and a total number of event signal harnesses and/or connectors are thus limiting factors in the number of electro-explosive devices (EEDs) or other electro-mechanical devices (EMDs) (e.g. servos, solenoids, etc) that can be activated in series and/or in parallel.

Thus, as will be discussed below, an ejection system is provided with an integrated electrical signal splitter. The integrated signal splitter can be provided in the form of a harness or a series of harnesses with integrated time delay(s) and/or integrated power booster(s). The device enables a single or redundant sequencer (controller) event firing signal (s) (electrical impulse/s) to fire one or multiple separate device(s) in parallel and/or in series. Each leg may include a direct firing signal transfer, a time-delayed firing signal transfer and/or a boosted firing signal transfer. The time delay may integrally rely on a predictable boot time for a signal booster.

Figure 1:
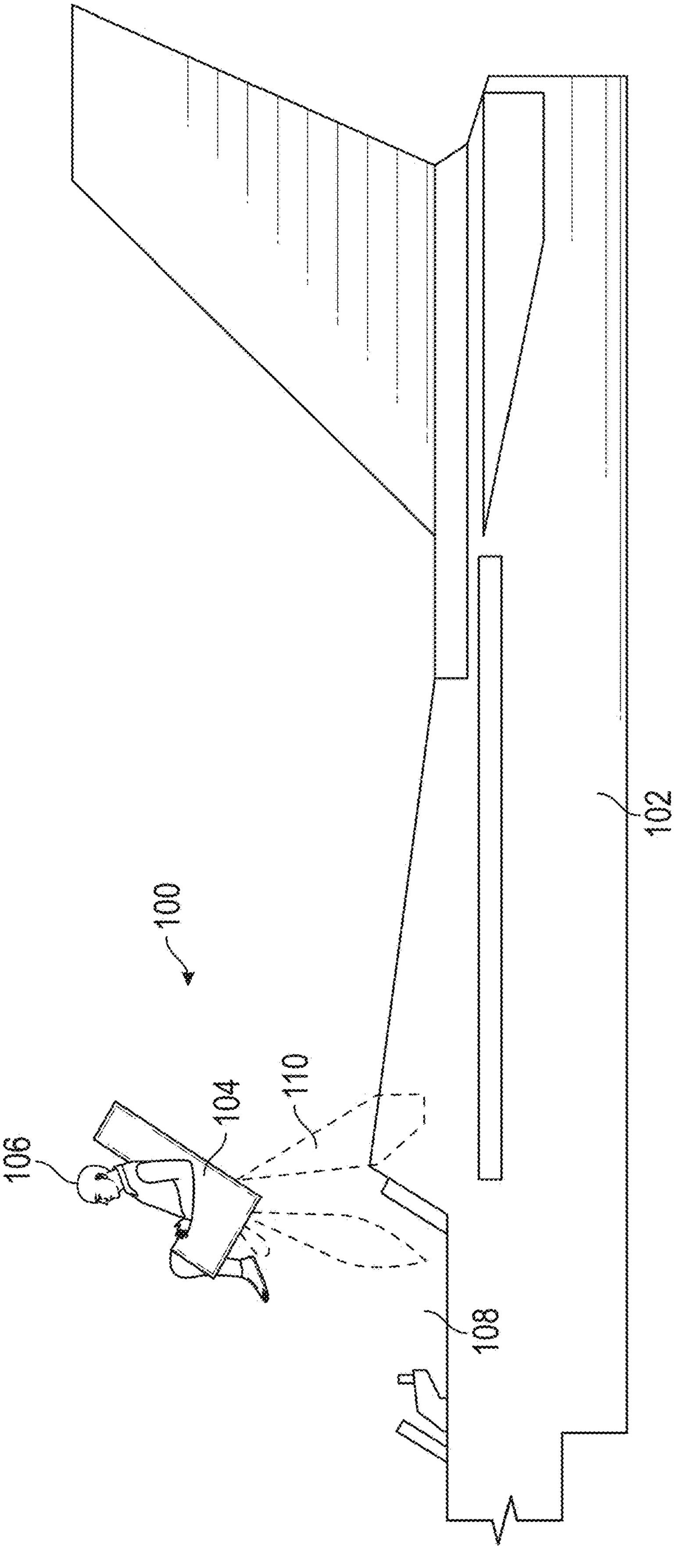
FIG. 1 illustrates an ejection seat being expelled (ejected) from an aircraft in accordance with one or more additional and/or alternative embodiments.

Referring now to FIG. 1, an aircraft ejection system 100 is illustrated, in accordance with various embodiments. Aircraft ejection system 100 includes an aircraft 102 and an ejection seat 104. Ejection seat 104 may be installed in aircraft 102 and be configured to expel (i.e.; eject) an occupant 106 (e.g., aircrew) from a cockpit 108. Ejection seat 104 may be propelled from aircraft 102, and more specifically, from cockpit 108 by a propellant 110. Propellant 110 may be configured to propel the combined mass of ejection seat 104 and occupant 106, and may consist of one or multiple cartridge and/or propellant actuated devices (e.g.; mortars, catapults, rockets). Ejection seat 104 is configured to restrain and secure occupant 106 while in aircraft 102 and during the initial stages of an ejection event.

Figure 2A:
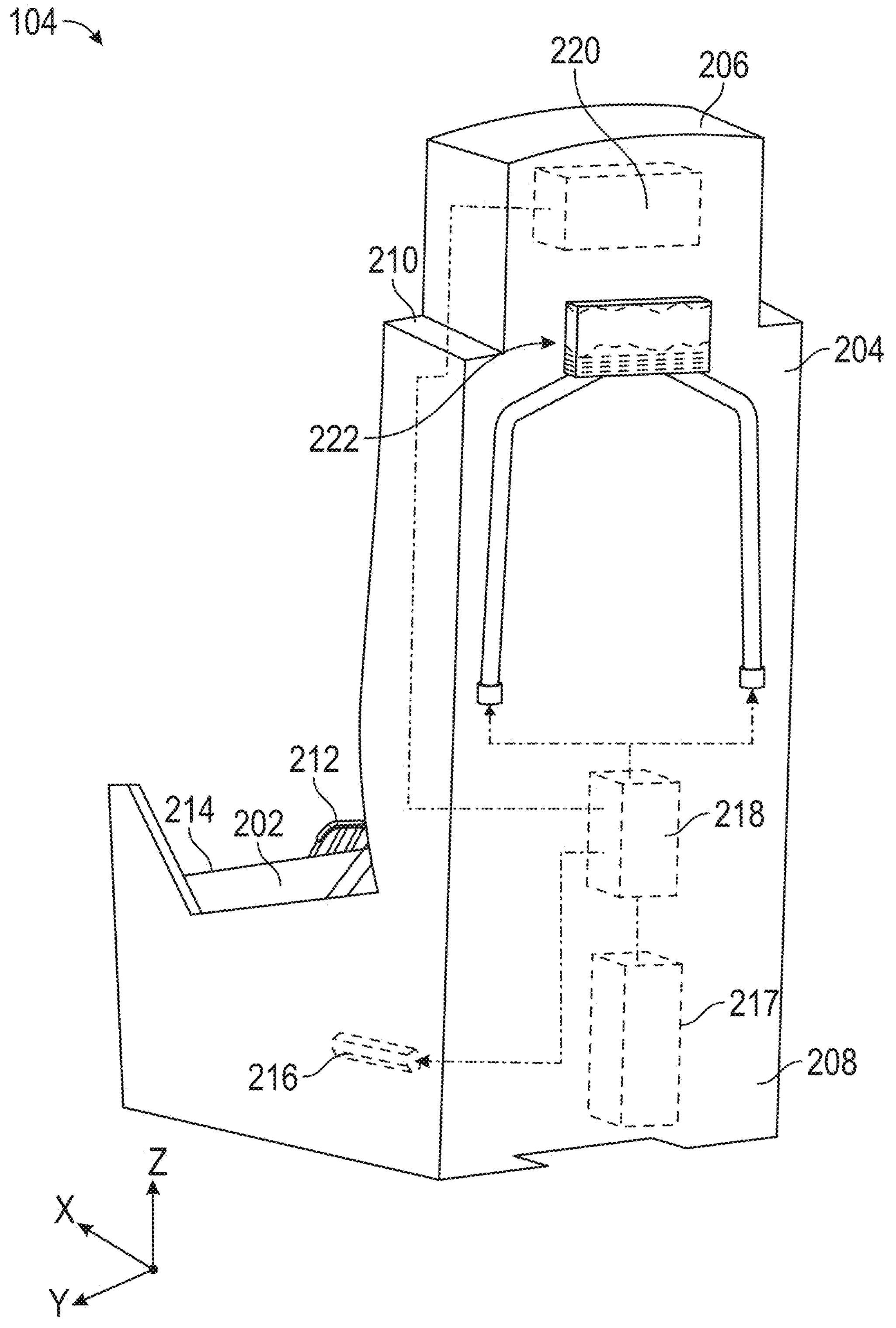
FIGS. 2A and 2B illustrate an ejection system in accordance with one or more additional and/or alternative embodiments.

Referring now to FIG. 2A, components of ejection seat 104 are illustrated, in accordance with various embodiments. Ejection seat 104 includes a seat pan 202, a seatback 204, a headrest 206, an ejection initiation handle 212, a seat-aircrew separator (i.e.; harness release) system 216, a catapult system 217, a controller 218, a main parachute 220, and, in various embodiments, a drogue parachute 222. Seat pan 202 may be located at a lower end 208 of seatback 204 and headrest 206 may be located at an upper end 210 of seatback 204.

Ejection seat 104 further includes an ejection handle 212 that, in various embodiments, may be located proximate a front side 214 of seat pan 202 (e.g., the positive x-direction). Front side 214 is opposite seatback 204. In various embodiments, ejection handle 212 may be located at a right side of seat pan 202 (e.g., the negative y-direction) and/or the left side of seat pan 202 (e.g., the positive y-direction). In various embodiments, ejection handle 212 may be centered between the right side and left side and configured to be between the legs of occupant 106. In various embodiments, ejection handle 212 may include more than one ejection handle. It should be understood that ejection handle 212 may be located in any position that is accessible to occupant 106 of ejection seat 104. Ejection handle 212 may be configured to initiate an ejection sequence upon actuation. For example, occupant 106 pulling/pushing ejection handle/lever/button 212 may cause ejection seat 104 to be expelled from aircraft 102.

Harness release system 216 secures ejection seat 104 to occupant 106. Harness release system 216 is connected to controller 218 and may receive signals from controller 218 controlling the activation of harness release system 216. Harness release system 216 disengages in one or multiple locations in response to signal(s) from controller 218, allowing ejection seat 104 to be separated from occupant 106 (i.e. seat-aircrew separation) after ejection from aircraft 102.

Catapult system 217 may secure ejection seat 104 to aircraft 102. Catapult system 217 may be connected to the power supply of controller 218 and may provide signals to power supply of controller 218 initiating activation of power supply of controller 218. Catapult system 217 is initiated by the aircraft 102 in response to a signal from ejection seat 104 in response to ejection handle 212 being actuated by occupant 106, allowing ejection seat 104 to be separated from aircraft 102. In various embodiments, catapult system 217 may further include propellent (e.g., propellant 110) for propelling ejection seat 104 away from aircraft 102. In various embodiments, catapult system 217 may further include separate propellant for propelling the ejection seat 104 up the rails of aircraft 102 and additional propellant (e.g., sustainer rocket propellant) for propelling the ejection seat 104 beyond aircraft 102 and away from structures and/or terrain.

Main parachute 220 (i.e.; recovery parachute) may be initially located (prior to deployment) near upper end 210 of seatback 204. Main parachute 220 may be deployed after ejection seat 104, including occupant 106, have cleared aircraft 102. Main parachute 220 is connected to controller 218 and may receive signals from controller 218 controlling the deployment of main parachute 220.

Drogue parachute 222 may be initially located (prior to deployment) near upper end 210 of seatback 204. In various embodiments, drogue parachute 222 may be located in other regions of seatback 204 with riser attachments near the rear-mid section of the seatback or other suitable structural attachment locations. While shown with two riser attachment locations, Drogue parachute 222 may include any number of risers and/or attachments, such as three or four. Drogue parachute 222 may be deployed prior to deploying a delayed main parachute 220 in order to decelerate ejection seat 104 to a safe speed for deploying main parachute 220. Drogue parachute 222 is connected to controller 218 and may receive signals from controller 218 controlling the deployment and/or separation of drogue parachute 222. In various embodiments, the conventional center-rear mounted drogue 222 may be combined with or replaced by multiple additional drogues mounted elsewhere.

Controller 218 controls the timing sequence of an ejection event in response to ejection handle 212 being actuated. The timing sequences that are managed by controller 218 may be different for each aircraft (e.g., aircraft 102). In various embodiments, the timing sequences are predetermined sequences for each aircraft. In various embodiments, controller 218 may receive input from one or more sensors that measure and output various real-time flight parameters in order to modify the timing sequences to the current conditions of ejection seat 104. The one or more sensors may include a temperature sensor, a pressure sensor, an air speed sensor, an altimeter, an accelerometer, and/or a gyroscope. Sensors may be capable of sensing in multiple axes and/or a discrete axis. Based on inputs from one or more of the sensors, controller 218 will control the deployment and/or release of harness release system 216, main parachute 220, and drogue parachute 222, in addition to other systems. Further, Controller 218 may be configured to control the deployment or activation of other subsystem events via signal from the ejection controller, such that the event sequence is optimized relative to other ejection sequence events.

Figure 2B:
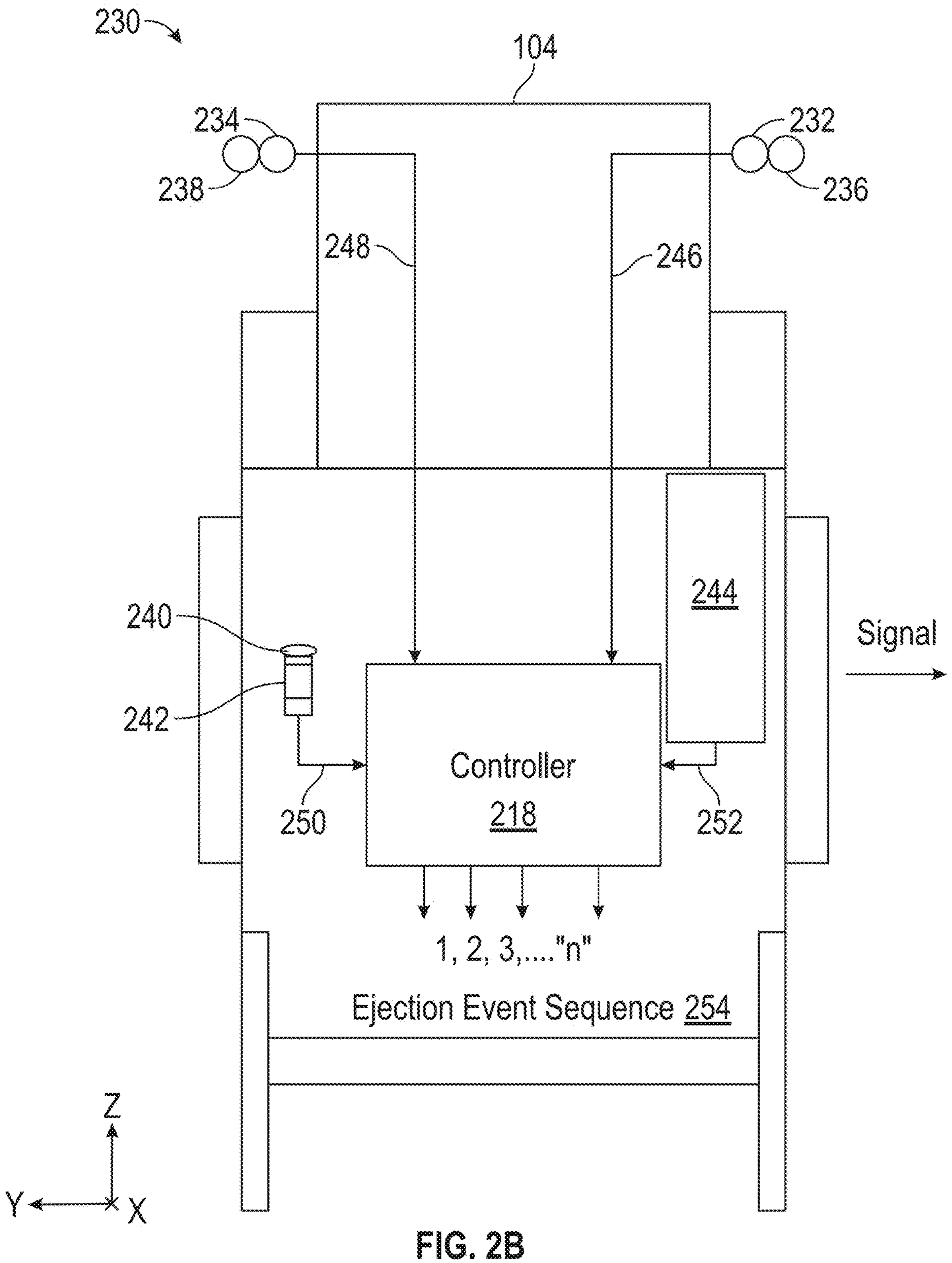

Referring now to FIG. 2B, a diagram 230 of ejection seat 104 is illustrated, in accordance with various embodiments. Diagram 230 includes controller 218 that may be connected to a first pressure sensor 232, a second pressure sensor 234, a first temperature sensor 236, a second temperature sensor 238, a third pressure sensor 240, a third temperature sensor 242, and accelerometer(s) 244. Controller 218 may be connected to first pressure sensor 232 and/or first temperature sensor 236 by a first connection 246 (e.g., wire, cable, tube, etc.). Controller 218 may be connected to second pressure sensor 234 and/or second temperature sensor 238 by a second connection 248. Controller 218 may be connected to third pressure sensor 240 and/or third temperature sensor 242 by a third connection 250. Controller 218 may be connected to accelerometer 244 by a fourth connection 252. In various embodiments, accelerometer 244 may include more than one accelerometer 244 each of which may be in different positions on ejection seat 104. In various embodiments, the sensors (e.g., accelerometer 244, first pressure sensor 232, first temperature sensor 236, etc.) may be integral to controller 218 (e.g., via circuit board mount, manifold, etc.). It should be understood that the number, location, and signal output (e.g., electrical, pneumatic, etc.) of sensors illustrated and described with respect to FIG. 2B is for illustration and discussion purposes only. Accordingly, there may be more or fewer sensors and/or the sensors may be at different positions with respect to ejection seat 104 and controller 218.

Controller 218 receives inputs from one or more of the sensors and outputs an ejection sequence 254 that may be optimized for the current conditions of ejection seat 104. In various embodiments, controller 218 may be programmed with one or more predefined ejection sequences (e.g., ejection sequence 254), or a sequence of events that are preformed to complete ejection of the ejection seat 104. In various embodiments, controller 218 may calculate a modified ejection sequence based on the predefined ejection sequence and input from one or more of the sensors. The inputs from the one or more sensors may provide additional information with respect to the state of ejection seat 104 or the environment surrounding ejection seat 104. Controller 218 may use this additional information to improve the safety for each occupant 106 of ejection seat 104.

Controller 218 may receive input from one or more of accelerometers 244 during an ejection sequence (e.g., after ejection handle 212 is actuated). In various embodiments, accelerometer 244 may be calibrated before installation to ensure proper data (e.g.; accuracy tolerances). Accelerometer 244 may provide acceleration data in three dimensions (e.g., along the x-axis, the y-axis, and the z-axis). In various embodiments, accelerometer may provide an acceleration and a direction to controller 218. In various embodiments, controller 218 may calculate an acceleration and a direction based on raw data received from accelerometer 244. In various embodiments, controller 218 may receive data from accelerometer 244 at regular time intervals. Each time interval may be about 0.5 ms to about 20 ms, and more specifically, about 1 ms to about 4 ms. In various embodiments, controller 218 may receive data from accelerometer 244 after ejection handle 212 has been actuated.

Controller 218 uses data from accelerometer 244 to determine an approximate size of occupant 106 (e.g.; weight, mass, height and/or the like) and adjusts ejection sequence 254 accordingly. For example, controller 218 may classify occupant 106 as small, medium, or large based on data from accelerometer 244 after ejection handle 212 is actuated. In various embodiments, controller 218 may classify occupant 106 as small or large. In various embodiments, controller 218 may have more than three classifications for the size of occupant 106 (e.g. very light, light, average, heavy, very heavy, and so on). In various embodiments, controller 218 may not assign classification to the size of occupant 106, but rather may indirectly calculate a change in velocity and assign a mass scalar which is useful for modification of the ejection sequence relative to the occupant size. Controller 218 determines a mass scalar based on the size of occupant 106 as inferred from various sensors and uses the determined mass scalar to modify ejection sequence 254. In various embodiments, the mass scalar may be about 0.5 to about 1.5, and more specifically, about 0.7 to about 1.3. In various embodiments, such as in the case of inertia dependent variable thrust profiles, a tighter mass scalar range of about 0.9 to about 1.1 may be used. The occupant size classifications are based on mass of the occupant along with any accompanying safety gear. In various embodiments, a small occupant may have a mass of less than about 150 lbs. (about 68 kilograms), a medium occupant may have a weight between about 150 lbs. (about 68 kilograms) and about 215 lbs. (about 97.5 kilograms), and a large occupant may have a weight of greater than about 215 lbs. (about 97.5 kilograms). In various embodiments, other ranges of mass may be used to identify the different size categories (e.g., small, medium, large). In various embodiments, ranges of change in velocity may be used to identify the different size categories (e.g., high, nominal, low) relative to a nominal, typical, or calibrated value.

Controller 218 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Controller 218 may further comprise memory to store data, executable instructions, system program instructions, and/or controller instructions to implement the control logic of controller 218.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Figure 3:
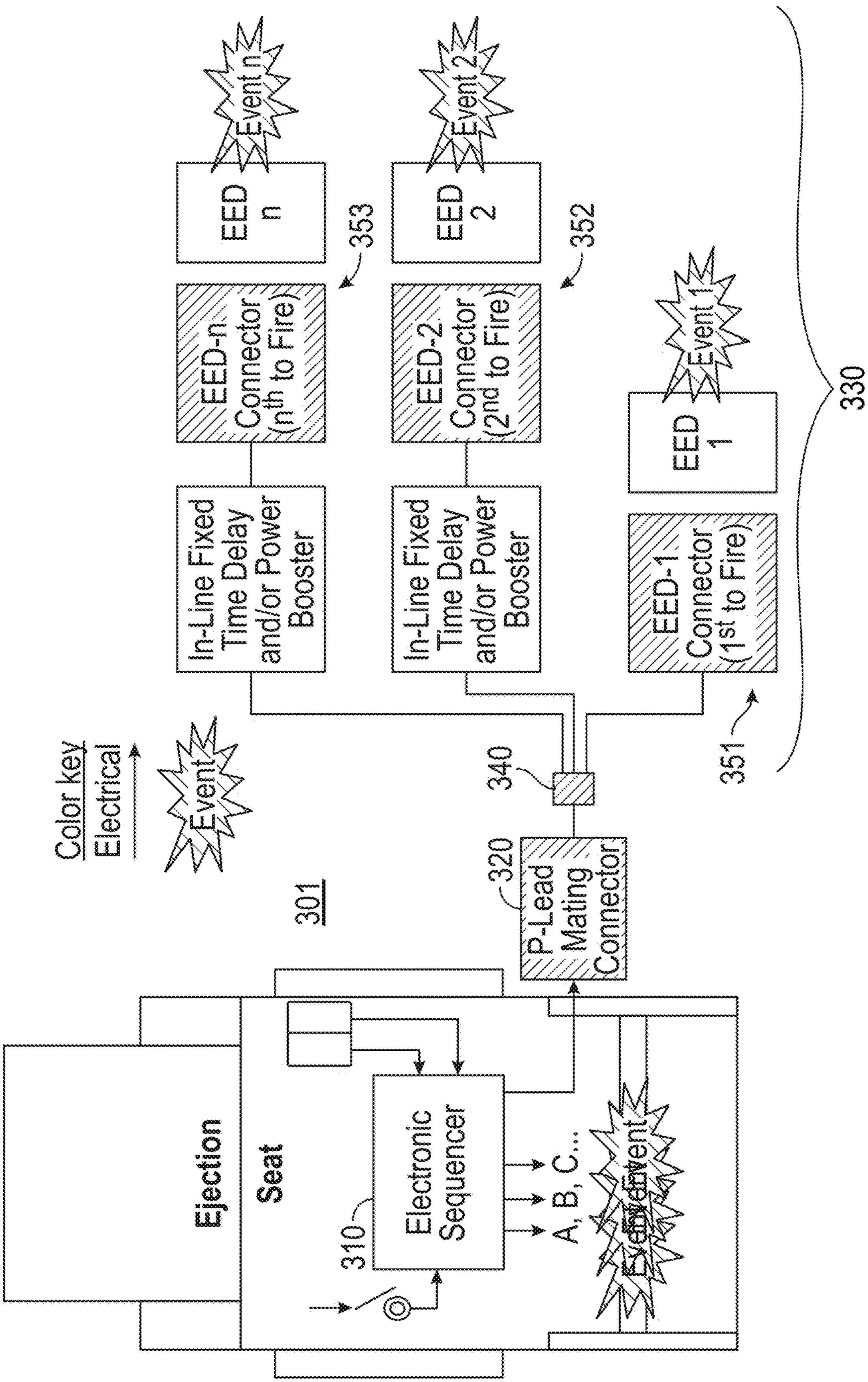
FIG. 3 is a schematic diagram of an ejection seat and an ejection system of an aircraft in accordance with one or more additional and/or alternative embodiments.
Figure 4A:
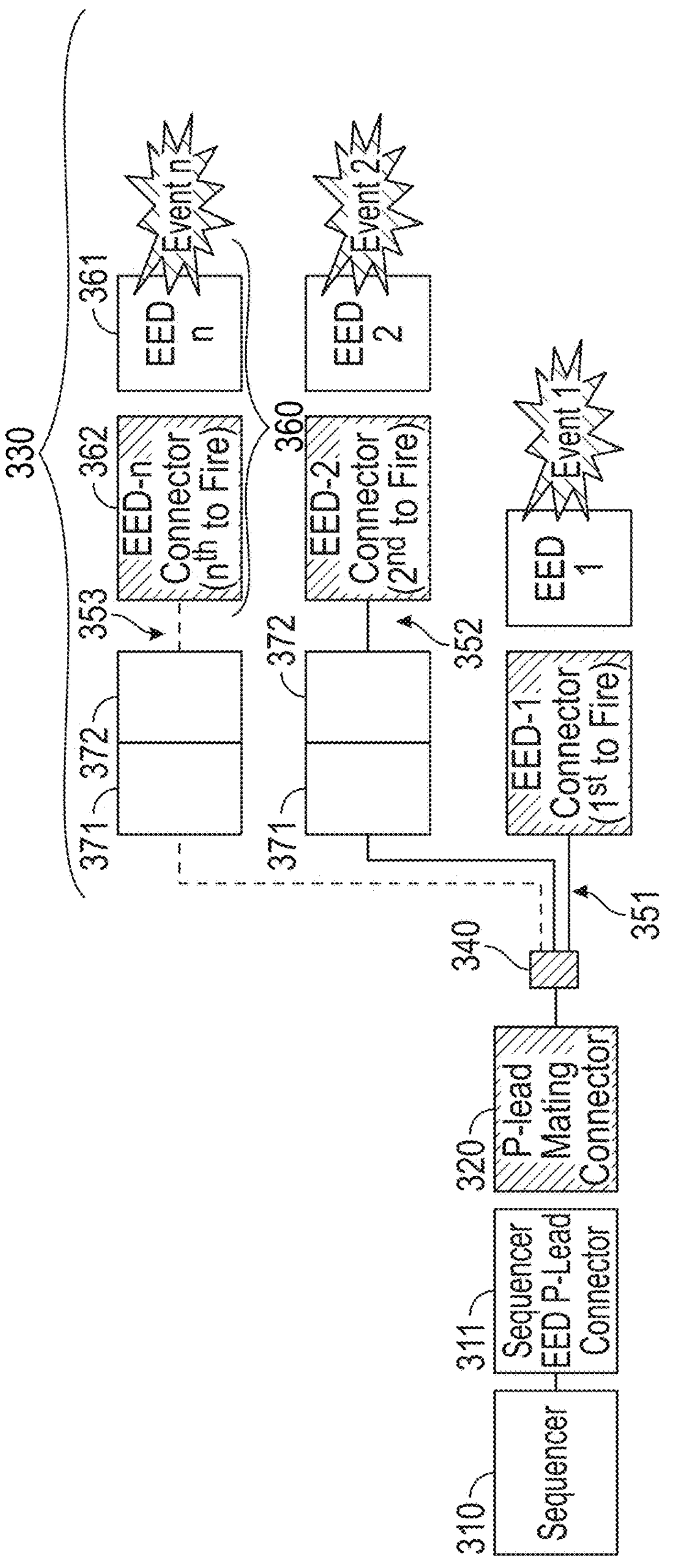
FIGS. 4A and 4B are diagrams illustrating components of the ejection system of FIG. 3 in accordance with one or more additional and/or alternative embodiments.
Figure 4B:
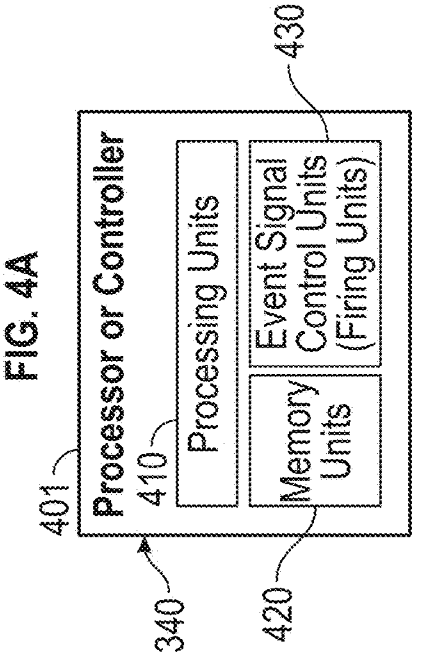

With reference to FIGS. 3, 4A and 4B, an ejection system 301 is provided and includes a sequencer unit 310, which corresponds to the controller 218 of FIGS. 2A and 2B and which includes a mating connector 311 (FIG. 4A), a lead mating connector 320 that is receptive of a single firing signal from the sequencer unit 310 and a splitter unit 330. It is to be understood that the single event firing signal can be provided as redundant firing signals in parallel for a single controller lead. The splitter unit 330 includes a splitter 340 and multiple splitter lines such as a first splitter line 351, a second splitter line 352 and a third splitter line 353. It is to be understood that the splitter unit 330 can include fewer splitter lines (i.e., two splitter lines) than what is shown in FIG. 3 or a greater number of splitter lines than what is shown in FIG. 3. The following description will, however, generally relate to the case of the splitter unit 330 including the first splitter line 351, the second splitter line 352 and the third splitter line 353; this is being done for purposes of clarity and brevity and should not be interpreted as limiting the description or the following claims in any way.

With reference to FIG. 4A, the splitter 340 is disposed in series with the lead mating connector 320 and is configured to generate, from the single firing signal, a first event firing signal for the first splitter line 351, a second event firing signal for the second splitter line 352 and a third event firing signal for the third splitter line 353. The first splitter line 351, the second splitter line 352 and the third splitter line 353 are disposed in parallel with one another and are each connected to the splitter 330 to be receptive of the first event firing signal, the second event firing signal and the third event firing signal, respectively. Each of the first splitter line 351, the second splitter line 352 and the third splitter line 353 includes a firing device unit 360, which is operable by a corresponding one of the first event firing signal, the second event firing signal and the third event firing signal. At least one of the first splitter line 351, the second splitter line 352 and the third splitter line 353 include at least one of a time delay unit 371 and a power booster 372 in series with and upstream from the firing device unit 360.

As an example, as shown in FIGS. 3 and 4A, the first splitter line 351 does not have either the time delay unit 371 or the power booster 372 whereas the second splitter line 352 and the third splitter line 353 each have both the time delay unit 371 and the power booster 372. The following description will generally relate to the case in which the first splitter line 351 does not have either the time delay unit 371 or the power booster 372 whereas the second splitter line 352 and the third splitter line 353 each have both the time delay unit 371 and the power booster 372; this is being done for purposes of clarity and brevity and should not be interpreted as limiting the description or the following claims in any way.

Each firing device unit 360 includes an EED/EMD 361 and an EED/EMD connector 362. Each time delay unit 371 can include or be provided as an in-line time delay unit that delays operation of the corresponding firing device unit 360 partially in accordance with a length of the at least one of the first and second splitter lines and partially in accordance with a predicted boot time of the corresponding power booster 372. Each power booster 372 can include or be provided as a power source, such as a capacitor or a battery (e.g., an electro-chemical battery and/or an electro-chemical thermal battery) and is configured to increase a power of the corresponding event firing signal.

In an exemplary case, the first splitter line 351 may be longest, the third splitter line 353 may be shortest and the second splitter line 352 is an intermediate length (this is not illustrated in FIG. 4A, but discussed for illustrative purposes). As such, the time delay unit 371 of the third splitter line 353 may be configured to apply a relatively long delay and the time delay unit 371 of the second splitter line 352 may be configured to apply an intermediate time delay so that all three firing device units 360 are operated simultaneously. Alternatively, in an event the first splitter line 351 is not in use and the power booster 372 of the second splitter line 352 has a longer boot time than the power booster 372 of the third splitter line 353, the time delay units 371 of the second splitter line 352 and the third splitter line 353 can be adjusted to enable simultaneous operations of the firing device units 360.

In some cases, simultaneous operation of all three firing device units 360 is not desirable due to current flight conditions, atmospheric conditions, etc. In these or other cases, the time delay units 371 and the power boosters 372 can be operated to achieve a given firing sequence that can be optimized for the current flight conditions, the atmospheric conditions, etc.

As shown in FIG. 4B, the splitter unit 330 can include a processor or controller 401 that can be a stand alone unit or a component of the splitter 340 for example (the latter case is illustrated in FIG. 4B). In either case, the processor or controller 401 includes a processing unit(s) 410, a memory unit(s) 420 and a event signal control unit(s) (firing circuits) 430 by which the processing unit(s) 410 controls various components of the splitter unit(s) 330. The memory unit(s) 420 has executable instructions stored thereon, which are readable and executable by the processing unit(s) 410. As will be described below, when the executable instructions are read and executed by the processing unit(s) 410, the processing unit(s) 410 sends instructions to the event signal control unit(s) 430 to control the various components of the splitter unit(s) 330.

Figure 5:
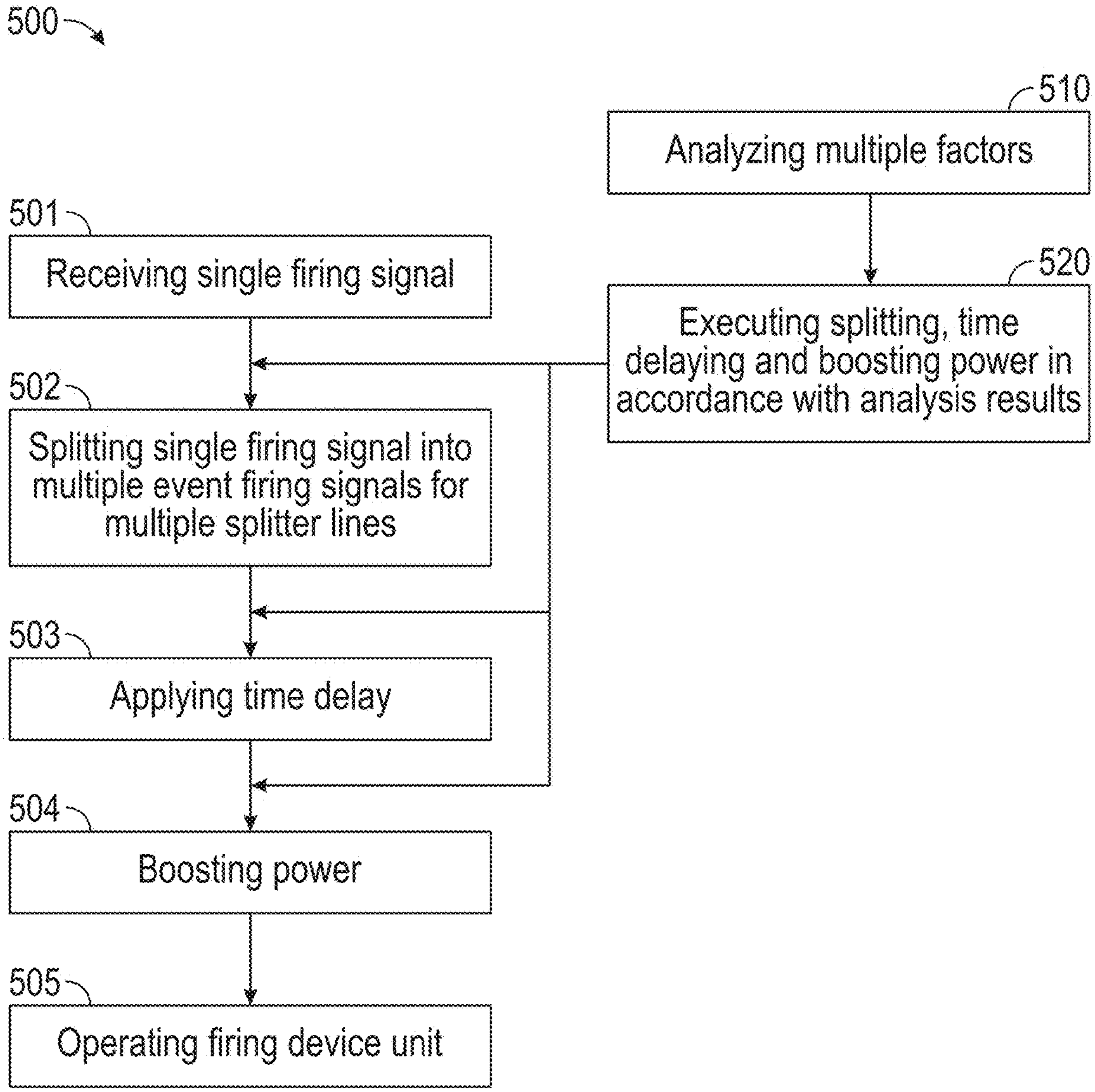
FIG. 5 is a flow diagram illustrating a method of controlling an ejection system in accordance with one or more additional and/or alternative embodiments.

With reference to FIG. 5, a method 500 of controlling an ejection system, such as the ejection system 301, is provided. The method 500 includes receiving, from a sequencer unit, a single firing signal (block 501), splitting, at a splitter, the single firing signal into multiple event firing signals for multiple splitter lines (block 502) and operating a firing device unit of each of the multiple splitter lines in accordance with the corresponding one of the multiple event firing signals (block 505). For at least one of the multiple splitter lines and prior to the operating of the firing device unit of block 505, the method further includes at least one of delaying the corresponding one of the multiple event firing signals (block 503) and boosting a power of the corresponding one of the multiple event firing signals (block 504).

In parallel logic, the method can further include analyzing multiple factors impacting a performance of the ejection system (block 510) and executing each of the splitting of the single firing signal into the multiple event firing signals of block 502, the delaying of the corresponding one of the multiple event firing signals of block 503 and the boosting of the power of the corresponding one of the multiple event firing signals of block 504 in accordance with results of the analyzing of block 510 (block 520). The multiple factors can include, but are not limited to, available power (e.g., power supply), characteristics of a sequence start signal (e.g., an operation of an electro-mechanical switch) and environmental factors that impact ejection (e.g., pressures, accelerations). The analyzing of block 510 and the executing of block 520 can be accomplished by the processing unit 410 of FIG. 4B in order to achieve simultaneous and/or sequenced firing of the firing device units described above.

Technical effects and benefits of the present disclosure are the provision of an ejection system with a time delayed signal splitter and booster. This can significantly improve aircrew safety in the event of an ejection event and has the ability to pair with other existing device firing events to sequence additional events. Supporting technologies are readily available for system integration.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An ejection system, comprising:

a lead mating connector receptive of a single firing signal;

a splitter disposed in series with the lead mating connector and configured to generate first and second event firing signals from the single firing signal; and first and second splitter lines connected to the splitter to be receptive of the first and second event firing signals, respectively, each of the first and second splitter lines comprising a firing device unit operable by a corresponding one of the first and second event firing signals, and at least one of the first and second splitter lines comprising at least one of a time delay unit and a power booster in series with and upstream from the firing device unit.

2. The ejection system according to claim 1, wherein the first and second splitter lines are in parallel.

3. The ejection system according to claim 1, wherein the splitter is configured to generate at least the first and second event firing signals from the single firing signal and at least first and second splitter lines are connected to the splitter to be receptive of the at least the first and second event firing signals, respectively.

4. The ejection system according to claim 1, wherein:

the splitter is configured to generate the first and second event firing signals and at least a third event firing signal from the single firing signal, the first and second splitter lines and at least a third splitter line are connected to the splitter to be receptive of the first and second event firing signals and the at least the third event firing signal, respectively, each of the first and second splitter lines and the at least the third splitter line comprises a firing device unit operable by a corresponding one of the first and second event firing signals and the at least the third event firing signal, and at least one of the first and second splitter lines and the at least the third splitter line comprises at least one of a time delay unit and a power booster.

5. The ejection system according to claim 4, wherein the first and second splitter lines and the at least the third splitter line are in parallel.

6. The ejection system according to claim 1, wherein the firing device unit comprises an electro-explosive/mechanical device and a connector.

7. The ejection system according to claim 1, wherein the time delay unit is an in-line time delay unit.

8. The ejection system according to claim 1, wherein the time delay unit of the at least one of the first and second splitter lines delays operation of the corresponding firing device unit partially in accordance with a length of the at least one of the first and second splitter lines.

9. The ejection system according to claim 8, wherein the time delay unit of the at least one of the first and second splitter lines delays operation of the corresponding firing device unit partially in accordance with a predicted boot time of the corresponding power booster.

10. The ejection system according to claim 1, wherein the power booster comprises a power source and is configured to increase a power of the corresponding one of the first and second event firing signals.

11. An ejection system, comprising:

a lead mating connector receptive of a single firing signal;

a splitter disposed in series with the lead mating connector and configured to generate multiple event firing signals from the single firing signal; and multiple splitter lines connected to the splitter to be receptive of the multiple event firing signals, respectively, each of the multiple splitter lines comprising a firing device unit operable by a corresponding one of the multiple event firing signals, and at least one of the multiple splitter lines comprising at least one of a time delay unit and a power booster in series with and upstream from the firing device unit.

12. The ejection system according to claim 11, wherein the multiple splitter lines are in parallel.

13. The ejection system according to claim 11, wherein the firing device unit comprises an electro-explosive/mechanical device and a connector.

14. The ejection system according to claim 11, wherein the time delay unit is an in-line time delay unit.

15. The ejection system according to claim 11, wherein the time delay unit of the at least one of the multiple splitter lines delays operation of the corresponding firing device unit partially in accordance with a length of the at least one of the multiple splitter lines.

16. The ejection system according to claim 15, wherein the time delay unit of the at least one of the multiple splitter lines delays operation of the corresponding firing device unit partially in accordance with a predicted boot time of the corresponding power booster.

17. The ejection system according to claim 11, wherein the power booster comprises a power source.

18. The ejection system according to claim 11, wherein the power booster is configured to increase a power of the corresponding one of the first and second event firing signals.

19. A method of controlling an ejection system, the method comprising:

receiving, from a sequencer unit, a single firing signal;

splitting, at a splitter, the single firing signal into multiple event firing signals for multiple splitter lines; and operating a firing device unit of each of the multiple splitter lines in accordance with the corresponding one of the multiple event firing signals, the method further comprising, for at least one of the multiple splitter lines and prior to the operating of the firing device unit, at least one of:

delaying the corresponding one of the multiple event firing signals; and boosting a power of the corresponding one of the multiple event firing signals.

20. The method according to claim 19, further comprising:

analyzing multiple factors impacting a performance of the ejection system; and executing each of the splitting of the single firing signal into the multiple event firing signals, the delaying of the corresponding one of the multiple event firing signals and the boosting of the power of the corresponding one of the multiple event firing signals in accordance with results of the analyzing.

* * * * *